United States Patent Office 3,100,795
Patented Aug. 13, 1963

3,100,795
PREPARATION OF METHYL METHACRYLATE
Russell K. Frantz, Gillette, and James F. Vitcha, New Providence, N.J., assignors to Air Reduction Company, Incorporated, New York, N.Y., a corporation of New York
No Drawing. Filed Dec. 26, 1961, Ser. No. 162,225
9 Claims. (Cl. 260—486)

This invention relates to an improved process for the preparation of methyl methacrylate and is more particularly concerned with the preparation of methyl methacrylate from methanol, propionic acid, and formaldehyde.

Prior art processes are known where methyl methacrylate is prepared by the catalytic vapor phase reaction of methyl propionate. These processes usually utilize an excess of methyl propionate; consequently, substantial amounts of unreacted methyl propionate are present in the product mixture. Water is formed during the reaction and propionic acid is produced by a side reaction, apparently due to hydrolysis, which results in free propionic acid in the product mixture. These processes have the disadvantage that the by-product propionic acid must be separated from the product mixture and esterified to methyl propionate before it can be recycled.

It is, therefore, an object of this invention to provide improved methods for the preparation of methyl methacrylate.

Another object of this invention is to provide a process where methyl methacrylate is prepared from methanol, propionic acid, and formaldehyde.

A further object is to provide a process for the preparation of methyl methacrylate by the reaction of methanol, propionic acid, and formaldehyde where the by-products and unreacted materials from this reaction are used in recycle operations.

A still further object is to provide a process for producing methyl methacrylate from methanol, propionic acid, and formaldehyde where the amount of unreacted propionic acid is low.

These and other objects, as well as other advantages and benefits of this invention will become apparent or will be clarified or will be specifically detailed in the following description.

In accordance with the invention it has been found that methyl methacrylate may be prepared from methanol, propionic acid, and formaldehyde. A mixture of methanol, propionic acid, and formaldehyde is vaporized and, while in the vapor phase, passed over a suitable catalyst. In the preferred form of this invention a continuous process is utilized. The materials that have passed over the catalyst are recovered and product methyl methacrylate is obtained by separation of these materials. The recovered materials consist primarily of methyl methacrylate, methanol, methyl propionate, propionic acid, and formaldehyde. Water is also present in the recovered materials; some water is produced during the reaction. Under continuous process operating conditions the recovered materials may be returned or recycled to the starting materials mixture or feed stock, after the methyl methacrylate has been recovered. Thus the recycle mixture is methanol, methyl propionate, propionic acid, and formaldehyde. The water in the recovered materials should be removed so that the recycle mixture contains no more than about 3% water. When the process of this invention is operated continuously the feed stock will include the recycle mixture and make up quantities of methanol, propionic acid, and formaldehyde. The fact that propionic acid and methanol can be used directly in the feed mixture results in the process of this invention having economic advantages of existing processes that start with methyl propionate.

Another important feature of this invention concerns the use of controlled amounts of methanol in the feed stock or feed mixture. By maintaining the amount of methanol within certain limits, the amount of propionic acid present in the product mixture or recovered materials is small. The methanol appears to be effective in preventing side reactions.

Operating continuously, the feed stock should be composed of propionic acid, methanol, methyl propionate, formaldehyde, and some water. The mole ratio of methyl propionate to formaldehyde should be maintained within the range from about 5:1 to about 15:1; with a preferred range of about 7.5:1. The methanol concentration should be about 15% to 25% by weight of the total feed stock; with a preferred methanol concentration being 20% by weight of the feed stock. The propionic acid should be about 4% to 12% by weight of the feed stock; with a preferred concentration of propionic acid being about 7% to 8% by weight of the feed stock. The amount of water in the feed stock should be kept at a minimum. It is desirable not to have the water concentration exceed 3% by weight of the feed stock; with a water concentration less than 1% by weight of the feed stock being preferred. A preferred feed stock would have the following proportions: 1 mole of propionic acid; 6 moles of methanol; 7.5 moles of methyl propionate; 1 mole of formaldehyde; and no more than 0.5 mole of water. The feed stock or feed mixture is obtained by adding the required amounts of methanol, propionic acid, and formaldehyde to the recycle mixture of methanol, methyl propionate, propionic acid, and formaldehyde, to maintain the desired proportions. Operating in this manner allows one to use propionic acid as the starting material in the production of methyl methacrylate.

The reaction takes place over a wide temperature range; temperatures in the range of about 325° C. to about 400° C. are satisfactory. Desirable and advantageous results are obtained by operating with temperatures in the range of about 350° C. to about 390° C. The process is normally run at atmospheric pressure, although higher or lower pressures may be used. Elevated pressures have the advantage of shorter catalyst contact time.

The space velocity of the vaporized feed mixture over the catalyst may be varied over wide limits. Space velocity figures in this specification are based on the total number of moles of materials entering the catalyst zone. Total moles are multiplied by the volume of a mole of an ideal gas at room temperature and one atmosphere (24 liters/mole), to obtain the total volume. A space velocity in the range from about 100 liters per hour per liter of catalyst to about 6000 liters per hour per liter of catalyst is useful. At atmospheric pressure, a space velocity in the range from about 100 liters per hour per liter of catalyst to about 1200 liters per hour per liter of catalyst is preferred. At a pressure of 100 p.s.i.g., a space velocity in the range from about 1000 liters per hour per liter of catalyst to about 6000 liters per hour per liter of catalyst is preferred.

Any of the various formaldehyde containing materials may be used, as formalin, methanolic formaldehyde solution, paraformaldehyde, and trioxane. A methanolic solution of formaldehyde is preferred.

Specific catalyst materials that are useful in this process include synthetic alkali metal aluminosilicates, natural alkali metal aluminosilicates, synthetic alkaline earth metal aluminosilicates, natural alkaline earth metal aluminosilicates, alkali metal hydroxides on synthetic aluminosilicates, alkali metal hydroxides on natural aluminosilicates, alkaline earth metal hydroxides on synthetic aluminosilicates, alkaline earth metal hydroxides on natural aluminosilicates, alkali metal hydroxides on silica gel, alkaline earth metal hydroxides on silica gel, sodium silicate on silica gel, potassium silicate on silica gel, molybdenum oxide on silica gel, silica gel, synthetic manganese aluminosilicate, natural manganese aluminosilicate, synthetic cobalt aluminosilicate, natural cobalt aluminosilicate, synthetic zinc aluminosilicate, and natural zinc aluminosilicate.

The preferred catalysts of this invention are potassium hydroxide on silica gel; rubidium hydroxide on silica gel; and cesium hydroxide on silica gel. Other inorganic compounds impregnated on a silica gel carrier are useful catalysts. Illustrative of other compounds that may be impregnated on silica gel are: sodium hydroxide, barium hydroxide, sodium silicate, potassium silicate and molybdenum oxide. The inorganic compounds can be about 0.5% to 10% by weight of the silica gel carrier.

Natural or synthetic aluminosilicates are useful catalysts in this invention. Aluminosilicates usually contain a chemically combined metal and silica and alumina. Specific aluminosilicates are the alkali metal and alkaline earth metal aluminosilicates, i.e., those where the metal is selected from sodium, potassium, rubidium, magnesium, calcium, strontium, and barium; and the aluminosilicates of manganese, cobalt, and zinc. Synthetic aluminosilicates may be prepared by a variety of methods, for example: (1) dehydrating silica alumina hydrogels and then introducing or exchanging a cation or metal; (2) co-precipitating metal silicates on silica gel; (3) impregnating a natural aluminosilicate with an active cation or metal. Attapulgite, a natural aluminosilicate, and other similar minerals or clays, treated or untreated, may be used as catalysts.

Generally, the aluminosilicates or synthetic zeolites having a large degree of porosity and a large amount of surface area are desirable. A synthetic sodium aluminosilicate manufactured by the Permutit Company and sold under the name "Decalso" is an effective type of aluminosilicate. "Decalso" may be treated by an ion exchange process to give a series of aluminosilicate catalysts. "Decalso" is a synthetic sodium aluminosilicate base ion-exchange material, and is used mainly for water softening.

Aluminosilicates of potassium, rubidium, magnesium, calcium, strontium, barium, manganese, cobalt, and zinc can be readily prepared from another aluminosilicate, such as sodium aluminosilicate, as "Decalso," by ion exchange techniques. For example the aluminosilicate can be treated with an aqueous salt solution containing the cation desired. Aqueous solutions of the appropriate metal salt, as acetate, chloride, sulfate or nitrate may be used.

Examples 1 to 3, which follow, illustrate various methods of preparing catalysts for use in the procedures of this invention.

EXAMPLE 1

Five hundred grams of a synthetic sodium aluminosilicate "Decalso" were packed into a long glass tube. Six liters of a 5% calcium acetate water solution was passed through the bed from the bottom at a rate of about 250 cubic centimeters per hour. The bed was then washed with about 12 liters of distilled water to remove any extraneous material or adsorbed salts. The calcium aluminosilicate was then drained, suction filtered, and dried in a forced draft oven at 375° C. for about 24 hours.

Other useful catalysts are the alkali metal hydroxides supported by a silica gel carrier. The alkali metal hydroxide can be about 0.5% to 10% by weight of the silica gel carrier.

The following Example 2 of preparing potassium hydroxide on silica gel is illustrative of the method used to prepare these catalysts; the other alkali metal hydroxide catalysts are prepared by a similar procedure.

EXAMPLE 2

A solution of 2.4 grams of 87% potassium hydroxide and 90 grams of water was prepared. This solution was poured on 200 grams of 6/10 mesh silica gel particles with vigorous stirring. The resulting mass was warmed while being mixed. The mass was heated for 2 hours, after which it was placed in a force draft air oven and dried for 3 hours at 375° C. The fines were screened from the resulting product and discarded. The catalyst was 1% by weight potassium hydroxide on silica gel.

The procedures used in Example 2 and the following Example 3 are representative of the techniques useful for impregnating a catalyst carrier as silica gel, and aluminosilicate.

EXAMPLE 3

The various impregnated inorganic compounds on silica gel can in general be prepared by the procedures outlined in Example 2. Molybdenum oxide on silica gel was prepared by dissolving 12.5 grams of ammonium molybdate in 70 ml. of water. The solution was mixed with 90 grams of 14/20 silica gel. The mixture was then dried at 400° C. for 24 hours.

The process of this invention may be conducted by a variety of techniques. In general, the major requirements being a suitable starting material mixture that is vaporized and then passed over a catalyst. It is desirable that heating means be provided to maintain the starting materials at the desired reaction temperature. The catalyst may be a fixed bed; fluidized or other techniques may be used. Means should be provided for maintaining the catalyst at the desired operating reaction temperature. The materials that have contacted the catalyst are in the vapor phase and they are condensed by cooling. Any suitable separation technique may be employed. Distillation may be used. The separation procedures are primarily for the recovery of the product methyl methacrylate. Water and other by-products may also be removed at this point. The amount of water in the feed stock may be regulated by controlling the amount of water in the recycle mixture and the amount of water in the methanol, propionic acid, and formaldehyde added to the recycle mixture. To simplify separation, up to about 2% of methyl methacrylate may be in the recycle mixture.

EXAMPLE 4

A mixture in the following proportions was prepared: 7.5 moles propionic acid, 14.0 moles methanol, and 1.0 mole formaldehyde. The formaldehyde was from "Formcel," a 55% methanolic solution of formaldehyde. Catalyst used was 1% KOH on silica gel. The mixture was vaporized and passed over the catalyst at a temperature of 375° C. to 395° C. and a space velocity of 1900 liters per hour per liter of catalyst. The yield of methyl methacrylate based on formaldehyde was 86%. The materials recovered and available for recycle was a mixture of 24 parts methanol, 51 parts methyl propionate, 6.5 parts propionic acid, and 1.4 parts formaldehyde, the water and methyl methacrylate formed having been removed prior to recycle.

EXAMPLE 5

The feed stock mixture was composed of 6 moles methanol, 7.5 moles methyl propionate, 1 mole propionic acid, and 1 mole formaldehyde (Formcel). Catalyst was 1% KOH on silica gel. Reaction temperature was 375° C. with space velocity of 1900 liters per hour per liter of catalyst. Methyl methacrylate conversion based upon formaldehyde was 66% and yield was 99%.

EXAMPLE 6

The following table illustrates a series of runs with varying concentrations of propionic acid present. The effect of methanol on the degree of hydrolysis as well as the effective use of propionic acid in the feed stock is illustrated by these data. The catalyst was 1% KOH on silica gel. Formaldehyde was "Formcel."

Table I

| Run No. | Feed, percent weight | | | | Temp., °C. | Space velocity, l./hr.l. | Product, percent weight | | | | Percent conv. | Percent yield |
|---|---|---|---|---|---|---|---|---|---|---|---|---|
| | Methyl propionate | Formaldehyde | Methanol | Propionic acid | | | Methanol | Propionic acid | HCHO | H$_2$O | | |
| 1 | 75.5 | 3.5 | 20 | 1 | 375 | 1,800 | 19.0 | 1.23 | 1.32 | 1.8 | 47 | 77 |
| 2 | 75.5 | 3.5 | 20 | 1 | 375 | 2,700 | 18.8 | 1.16 | 1.16 | 1.6 | 42 | 80 |
| 3 | 74.6 | 3.4 | 20 | 2 | 375 | 1,500 | 19.2 | 1.84 | 0.71 | | 67 | 84 |
| 4 | 74.6 | 3.4 | 20 | 2 | 375 | 2,800 | 18.7 | 1.71 | 1.35 | | 47 | 88 |
| 5 | 72.7 | 3.3 | 20 | 4 | 375 | 1,700 | 18.0 | 2.11 | 0.99 | 2.2 | 59 | 83 |
| 6 | 72.7 | 3.3 | 20 | 4 | 375 | 2,600 | 17.5 | 1.9 | 1.71 | 2.0 | 42 | 86 |
| 7 | 68.9 | 3.1 | 20 | 8 | 375 | 1,900 | 16.5 | 3.2 | 1.07 | 3.73 | 66 | 99 |
| 8 | 68.9 | 3.1 | 20 | 8 | 375 | 2,800 | 15.2 | 2.82 | 1.86 | 3.32 | 50 | 100 |
| 9 | 65 | 3.0 | 20 | 12 | 375 | 1,900 | 14.2 | 3.35 | 0.65 | 3.72 | 62 | 80 |
| 10 | 65 | 3.0 | 20 | 12 | 375 | 2,700 | 15.0 | 3.96 | 1.63 | 4.05 | 38 | 82 |
| 11 | | 3.0 | 43.5 | 53.5 | 385 | 2,900 | 24.5 | 6.4 | 1.45 | 12.9 | 43 | 86 |
| 12 | | 3.0 | 43.5 | 53.5 | 380 | 1,900 | 23.7 | 6.1 | 1.46 | 13.2 | 41 | 83 |

We claim:
1. A process which comprises preparing a vapor phase mixture of methanol, propionic acid, and formaldehyde; passing said vapor phase mixture over a catalyst selected from the group consisting of alkali metal aluminosilicates, alkaline earth metal aluminosilicates, alkali metal hydroxides on aluminosilicates, alkaline earth metal hydroxides on aluminosilicates, alkali metal hydroxides on silica gel, alkaline earth metal hydroxides on silica gel, sodium silicate on silica gel, potassium silicate on silica gel, molybdenum oxide on silica gel, manganese aluminosilicate, cobalt aluminosilicate, and zinc aluminosilicate; and recovering methyl methacrylate from the reaction products.

2. A process according to claim 1, where the vapor phase mixture is at a temperature from about 325° C. to about 400° C. and is passed over the catalyst at a space velocity from about 100 liters per hour per liter of catalyst to about 6000 liters per hour per liter of catalyst.

3. A process for preparing methyl methacrylate which comprises adding methanol, propionic acid, and formaldehyde, to a recycle mixture containing methanol, methyl propionate, propionic acid, and formaldehyde, to form a feed stock mixture; vaporizing said feed stock mixture; passing said vaporized mixture over a catalyst selected from the group consisting of alkali metal aluminosilicates, alkaline earth metal aluminosilicates, alkali metal hydroxides on aluminosilicates, alkaline earth metal hydroxides on aluminosilicates, alkali metal hydroxides on silica gel, alkaline earth metal hydroxides on silica gel, sodium silicate on silica gel, potassium silicate on silica gel, molybdenum oxide on silica gel, manganese aluminosilicate, cobalt aluminosilicate, and zinc aluminosilicate; recovering the materials that have passed over the catalyst; separating methyl methacrylate from said recovered materials; and preparing said recycle mixture from methanol, methyl propionate, propionic acid, and formaldehyde contained in said recovered materials.

4. A process according to claim 3 where said feed stock mixture comprises from about 15 percent to about 25 percent by weight of the feed stock of methanol; from about 4 percent to 12 percent by weight of the feed stock of propionic acid; where said feed stock contains no more than 3 percent by weight of the feed stock of water; and where the mole ratio of methyl propionate to formaldehyde is within the range from about 5:1 to about 15:1.

5. A process according to claim 1 where the catalyst is an alkali metal hydroxide on silica gel.

6. A process according to claim 1 where the catalyst is an alkaline earth metal hydroxide on silica gel.

7. A process according to claim 1 where the catalyst is potassium hydroxide on silica gel.

8. A process according to claim 1 where the catalyst is rubidium hydroxide on silica gel.

9. A process according to claim 1 where the catalyst is cesium hydroxide on silica gel.

No references cited.